Oct. 28, 1924. 1,513,586
W. DAVIS
ELECTRICALLY OPERATED BRAKE CONTROLLING MEANS FOR AUTOMOBILES
Filed June 28, 1923 2 Sheets-Sheet 1
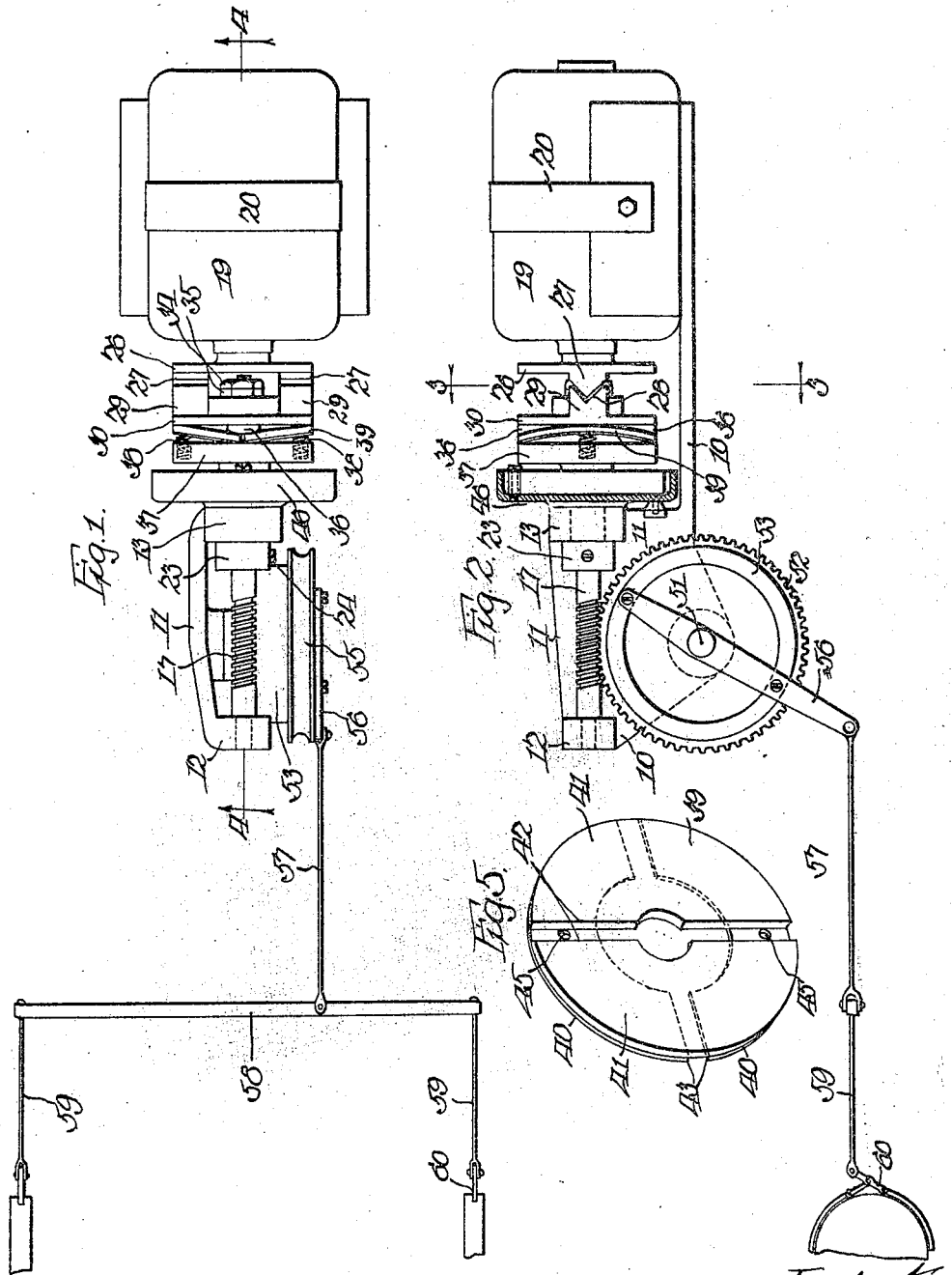

Oct. 28, 1924. 1,513,586
W. DAVIS
ELECTRICALLY OPERATED BRAKE CONTROLLING MEANS FOR AUTOMOBILES
Filed June 28, 1923 2 Sheets-Sheet 2
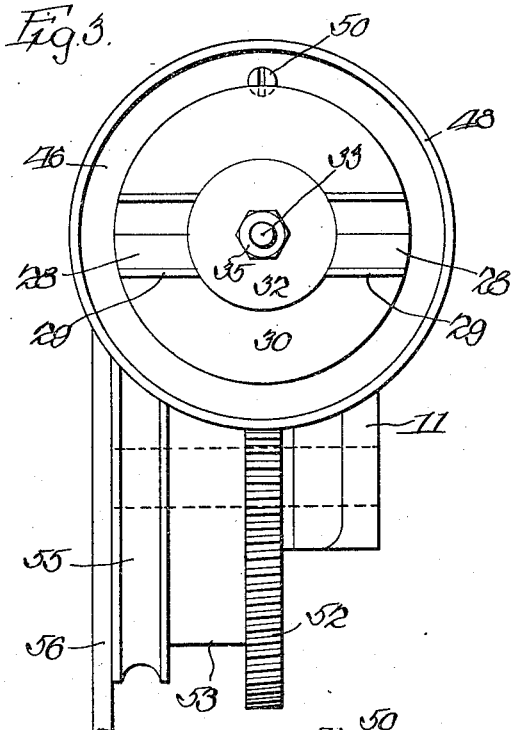
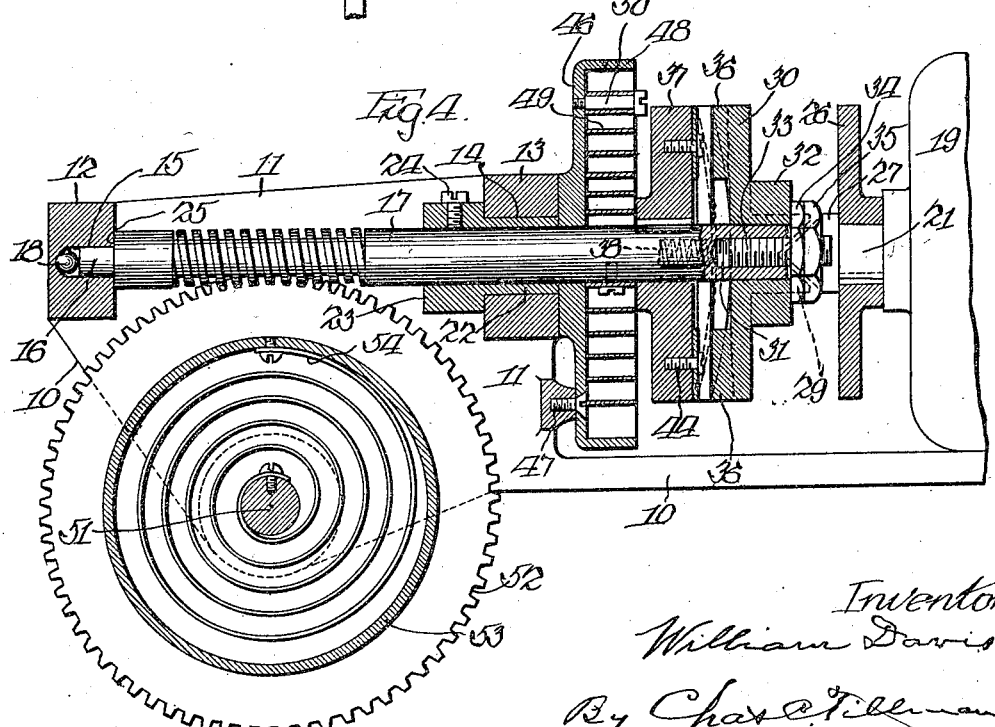
Inventor
William Davis
By Chas. C. Tillman
Atty.

Patented Oct. 28, 1924.

1,513,586

UNITED STATES PATENT OFFICE.

WILLIAM DAVIS, OF CHICAGO, ILLINOIS.

ELECTRICALLY-OPERATED BRAKE-CONTROLLING MEANS FOR AUTOMOBILES.

Application filed June 28, 1923. Serial No. 648,236.

*To all whom it may concern:*

Be it known that I, WILLIAM DAVIS, a citizen of the United States, residing at Chicago, in the county of Cook and State of Illinois, have invented certain new and useful Improvements in Electrically-Operated Brake-Controlling Means for Automobiles, of which the following is a specification.

This invention relates to improvements in controlling means for brakes for vehicles, and particularly to a type of such means or mechanism especially intended for use on automobiles and in which electricity is employed for operating the apparatus.

The invention contemplates as one of the objects thereof, the provision of an electrically operated brake controlling means for automobiles and the like, which shall be of such construction and arrangement of its parts that it shall be operable with a minimum expenditure of electric energy or power applied thereto through a motor for braking or stopping the vehicle on which the mechanism is mounted.

Another object of the invention is to prevent injury to the motor, by providing in the line of power transmission from the motor to the frictional brake-bands or members of the device, yieldingly resisting frictional means or such a clutch to co-operate with parts driven by the motor, in such a manner as to cause the brake-band or member to be applied to its drum or an equivalent part with which it co-acts, with sufficient frictional stress to stop the vehicle without stopping the motor.

A further object is, to furnish means for automatically releasing or relieving the brake of stress or clamping action as soon as the motor of the mechanism is de-energized, and at the same time, re-set the parts in position for again applying the brake when desired.

Still another object is the provision of an apparatus of the above mentioned general character, which shall be strong, durable, highly efficient in operation, compact in form, easily assembled, and mounted in position on almost any kind of an automobile or other vehicle.

Other objects and advantages of the invention will become apparent from the following description and explanation.

The invention will be explained and more readily understood when read in conjunction with the accompanying drawings, in which an embodiment of the invention is illustrated, it being obvious that changes and modifications may be resorted to without departing from the spirit of the invention, so long as they come within the scope of the appended claims forming a part hereof.

Referring to the drawings,—

Figure 1 is a plan view of the device showing it diagrammatically applied to the ordinary equalizer for operating brake-bands of a well known construction employed on automobiles.

Fig. 2 is a side view thereof.

Fig. 3 is a view in elevation taken on line 3—3 of Fig. 2 looking in the direction indicated by the arrows.

Fig. 4 is an enlarged longitudinal sectional view taken on line 4—4 of Fig. 1 as indicated by the arrows, and Fig. 5 is a detached perspective view of one of the elements of the yieldingly resisting frictional clutch of the device.

Corresponding numerals of reference refer to like parts throughout the different views of the drawings.

Referring now more particularly to Figs. 1, 2 and 4 of the drawings, the reference numeral 10 designates as a whole a support or bracket for the device, which support or bracket may be horizontally mounted on any desirable part of an automobile or other vehicle frame. As will be seen in the above mentioned figures of the drawings, the bracket 10 comprises an offset upright portion 11 which is extended longitudinally with respect to the base portion of the bracket and has at its free end a lateral bearing extension 12 and at its other end a similarly disposed bearing extension 13 which is provided with a horizontal opening 14 while the bearing extention 12 is provided on its surface adjacent the extension 13 with a socket 15 for the reception of the reduced end portion 16 of the worm shaft 17 which is journaled in the bearing extensions 12 and 13 as shown. The socket 15 may have located therein between its closed end and the end of said reduced portion 16 a ball bearing 18 to take care of the end thrust of the worm shaft.

Mounted on the base portion of the bracket 10 at the end thereof opposite the extension 12 is an electric motor 19 which may be firmly secured to the bracket by means of a strap 20 extended over the motor and secured at its end to the bracket or otherwise. The motor is so mounted on the bracket 10 that its shaft 21 will align with the worm shaft 17 at its inner or front end. Mounted on the worm shaft 17 is a sleeve 22 which has an annular enlargement 23 to abut against the inner surface of the bearing extension 13 within which the reduced portion of the sleeve 22 is located. This sleeve is fixed to the worm shaft 17 by means of a set screw 24 and is employed to prevent longitudinal movement of the said shaft towards the motor, it being understood that the shoulder 25 produced by the reduced portion 16 of said shaft and the ball bearing 18 will prevent longitudinal movement of the worm shaft in the opposite direction.

Keyed to or fixedly mounted on the motor shaft 21 is a head 26 of disk form which has on its face opposed to the motor an aligned pair of teeth or projections 27 each of which is preferably beveled as shown in Fig. 2 to engage the recesses 28 in a pair of aligned teeth or projections 29, which a clutch disk 30 mounted on the end of the worm shaft adjacent the head 26 carries.

As is clearly shown in Figs. 3 and 4, the end of the worm shaft adjacent the motor is provided with a screw-threaded opening 31 and the disk 30 is provided centrally with an orificed enlargement 32 on its face adjacent the head 26 of the motor, and it will be understood that the teeth or projections 27 on said head as well as the projections 29 on the disk 30, are spaced for the reception of said enlargement.

The disk 30 is mounted on the shaft 17 for independent rotary movement and also for slight slidable movement thereon, and is held in place by means of a screw bolt 33 and a nut 34 located on the bolt 33 so as to impinge the face of the enlargement 32 of said disk. A lock nut 35 engaging the outer end of the bolt 33 serves to hold the nut 34 in its adjusted position. The disk 30 has on its face opposite the recessed projections 29 and transversely disposed with respect thereto, a pair of aligned cams 36 whose rear surfaces are slightly rounded as is clearly shown in Fig. 1 of the drawings.

Keyed or fixed to the worm shaft 17 adjacent the cam face of the disk 30 is a clutch disk 37 which carries a pair of coiled springs 38 located diametrically opposite each other in suitable recesses formed in the face of the disk 37 adjacent the disk 30. Interposed between the disks 30 and 37 is a spring-actuated disk designated as a whole by the numeral 39 which surrounds the shaft 17 loosely and is by preference made up of a pair of semi-circular flexible pieces 40 of sheet metal and a pair of substantially semi-circular pieces 41 of fibre. The pieces of fibre are secured to the pieces 40 of sheet metal so as to have their substantially straight edges 42 slightly spaced from each other and transversely with respect to the approximated edges 43, of the sheet metal portions, as is clearly shown in Fig. 5 of the drawings. The metal pieces 40 of the disk 39 are secured to the disk 37 by means of screws 44 extended through openings 45 in the pieces 40 between the adjacent edges of the fibre members of said spring-actuated disk so as to rest against the spring 38 which serve to provide yielding pressure between the disk 39 and the cams 36 of the clutch disk 30.

Mounted around the shaft 17 between the disk 37 and the front end of the upright portion 11 of the bracket or support, is a circular housing 46 which is rigidly secured to the part 11 of the bracket by means of a screw bolt 47 or otherwise. This housing, as is clearly shown in Fig. 4 of the drawings, has an overhanging flange 48 projected towards the disk 37 and serves to shield a coiled spring 49 one end of which is secured to a pin 50 fixed to the housing within the flange thereof and the other end of said spring is fixed to the shaft 17 so that in the rotation of said shaft in one direction, that is, in the direction it will take when the brakes are set, this spring will be placed under tension.

Rigidly mounted on the bracket 10 near its rear lower portion is a shaft 51 on which is mounted in mesh with the worm 17, a worm gear 52 which carries a circular housing 53 to the inner surface of which is secured one end of a coiled spring 54 the other end of which spring is fixedly secured to the shaft 51 on which said gear is mounted to turn. The housing 53 is by preference provided with a groove or guideway 55 for a cable or belt to be used for the purpose to be presently explained.

As shown in Figs. 1 and 3, the groove or guide-way 55 is located peripherally at the outer end of the housing 53 and it also will be understood by reference to said figures, as well as to Fig. 2 of the drawings, that the housing 53 has secured thereto diametrically across its face an arm or lever 56 which projects at one of its ends a considerable distance from the periphery of the gear 52, see Fig. 2 of the drawings.

To the free end of this arm or lever 56 is pivotally connected one end of link 57 the other end of which is pivotally connected to an equalizing bar 58 of an automobile from each end of which bar is extended a link or connection 59 united at its rear end to a suitable mechanism designated as a whole by the numeral 60 for causing the brake-bands or brake members to clamp or impinge the brake-drums or their equivalents for braking or stopping the vehicle.

By employing the bolt 33 with the adjustable nut 34 thereon, it is apparent that the disk 30 will not only be held in position on the shaft 17 for rotation thereon, but that by suitably adjusting the nut 34, the tension of the springs 38 against the disk 30 can be regulated and maintained at the desired tension by screwing up the lock nut 35 against the said adjustable nut.

From the foregoing and by reference to the drawings, it will be readily understood and clearly seen that in the rotation of the motor shaft in the proper direction, the head 26 thereon will engage, through the instrumentality of its projections or teeth 27, and the recessed projections 29, the disk 30, thereby causing the latter to be turned in the same direction as that of the head 26 on the motor shaft. In this operation the cams 36 of the disk 30 will co-operate with the spring-actuated members of the disk 39 in such a way as to create yielding frictional resistance between the disk 30 and the disk 37, and as this latter named disk is keyed to the worm shaft 17, it is manifest that said shaft will be turned in the proper direction to cause the worm 52 to be rotated on its shaft in a manner to retract the extended portion of the lever or arm 56 and through its connection with the equalizer bar 58, set the brakes, which position of the parts may be maintained as long as it is desired, but it will be understood that the yieldingly resisting means employed in the power transmission line between the motor shaft and the brakes, will prevent injury to the motor. It is further manifest that as soon as the motor is de-energized, the springs 49 and 54, which in the foregoing operation have been placed under tension, will exert their tension to reverse the movement of the worm gear 52 and worm shaft 17, thereby releasing pressure from the brake-applying means and resetting the parts of the mechanism for a repetition of the above explained operation.

While the worm gear 52 is shown as being equipped with a spring 54 for reversing its movement after the motor has been de-energized, and while this spring will to some extent assist in the reverse movement of the worm shaft 17, yet the employment of the spring 54 is not essential and may sometimes be omitted. The tension of the spring 49 is sufficient, after the motor has been de-energized to overcome the slight resistance of the armature and parts of the motor, so that the movement of its shaft may be reversed in the reverse movement of the worm shaft.

Having thus fully described my invention, what I claim as new and desire to secure by Letters Patent is:

1. In a mechanism of the class described, the combination with a brake-drum of a vehicle, of means to apply frictional pressure to said drum, a suitably mounted electric motor, power transmission means connecting the motor and said frictional means for applying pressure to the drum, yielding frictional resisting means in said line of power transmission co-acting with the motor to cause sufficient pressure to be applied to the drum, said power transmission means including a worm shaft spring-actuated in one direction to release the pressure applying means and to restore the parts of the device to their normal positions.

2. In a mechanism of the class described, the combination with a brake-drum of a vehicle, of means to apply frictional pressure to said drum, a suitably mounted electric motor, power transmission means connecting the motor and said frictional means for applying pressure to the drum, yielding frictional resisting means in said line of power transmission co-acting with the motor to cause sufficient pressure to be applied to the drum, said power transmission means including a worm gear operatively connected to the means for applying frictional pressure to the drum, a worm shaft in engagement with said gear, said shaft and gear being spring-actuated in one direction to release the pressure applying means to the drum and to restore the parts of the device to their normal positions.

3. In a mechanism of the class described, the combination with a support, of a worm shaft journaled thereon, a worm gear in mesh with said shaft, an electric motor mounted near one end of and with its shaft in alignment with said worm shaft, a disk fixed on the motor shaft, an idler disk mounted on the worm shaft adjacent the motor, inter-engaging means on said disks, a spring around the worm shaft having one of its ends fixed thereto and its other end to a fixed support, a clutch disk fixed on the worm shaft between said spring and said idler disk, yieldingly resisting frictional means interposed between said clutch disk and said idler disk, and means carried by said worm gear for operatively connecting it to means for applying frictional pressure to the drum of a vehicle.

4. In a mechanism of the class described, the combination with a support, of a worm shaft journaled thereon, a spring around said shaft and connected at one of its ends thereto and at its other end to a fixed support, a worm gear in mesh with said shaft, an electric motor mounted near one end of and with its shaft in alignment with said worm shaft, a disk fixed on the motor shaft, an idler disk adjustably mounted on the worm shaft adjacent the motor, inter-engaging means on said disks, a clutch disk fixed on the worm shaft between the said spring and said idler disk, a flexible spring-actuated disk mounted on the face of the clutch disk adjacent the idler disk, said idler disk having cams to co-operate with said flexible disk, and means connecting said worm gear to means for applying frictional pressure to the brake-drum of a vehicle.

5. In a mechanism of the class described, the combination with a support, of a worm shaft journaled thereon, a worm gear in mesh with said shaft, an electric motor mounted near one end of and with its shaft in alignment with said worm shaft, a disk fixed on the motor shaft, an idler disk mounted on the worm shaft adjacent the motor, inter-engaging means on said disks, the said idler disk having a cam face opposed to the disk on the motor shaft, a spring surrounding the worm shaft and secured thereto at one of its ends and at its other end to a fixed support, a clutch disk fixed on the worm shaft between said spring and said idler disk, a flexible spring-actuated disk mounted on the face of the clutch disk adjacent the idler disk for co-operation with the cam face of the last named disk.

6. A mechanism of the class described including in combination, a support, a worm shaft journaled thereon, a worm gear in mesh with said shaft, an electric motor mounted near one end of and with its shaft in alignment with said worm shaft, a disk fixed on the motor shaft, an idler disk mounted on the worm shaft adjacent the motor, inter-engaging means on said disks, the said idler disk having a cam face opposed to the disk on the motor shaft, a housing loosely surrounding the worm shaft and fixed to said support, a coil spring around said shaft having one of its ends fixed thereto and its other end to said housing, a clutch disk fixed on the worm shaft between the housing and said idler disk, and a flexible spring-actuated disk mounted on the face of the clutch disk adjacent the idler disk for co-operation with the cam face of the last named disk.

7. In a mechanism of the class described, the combination with a suitably journaled motor driven worm shaft, of a spring around said shaft and secured at one of its ends thereto and at its other end to a fixed support, a shaft transversely journaled with respect to said worm shaft, a worm gear on said transverse shaft and in mesh with said worm shaft, a coil spring around the shaft of said gear and secured at one of its ends to the gear shaft and at its other end to said gear, the spring on the worm shaft and on the worm gear being employed to reverse the movements of said shafts and gear upon de-energizing the motor and thereby returning said parts to their normal positions.

WILLIAM DAVIS.